(12) United States Patent
Kato et al.

(10) Patent No.: US 9,416,896 B1
(45) Date of Patent: Aug. 16, 2016

(54) TUBE CLIP ASSEMBLY
(71) Applicant: ILLINOIS TOOL WORKS INC., Glenview, IL (US)
(72) Inventors: Eric J. Kato, Morton Grove, IL (US); Thomas A. Benoit, Bourbonnaise, IL (US); Mark O. Lepper, Oak Park, IL (US)
(73) Assignee: Illinois Tool Works Inc., Glenview, IL (US)
( * ) Notice: Subject to any disclaimer, the term of this patent is extended or adjusted under 35 U.S.C. 154(b) by 0 days.
(21) Appl. No.: 14/870,100
(22) Filed: Sep. 30, 2015
(51) Int. Cl.
*F16L 3/08* (2006.01)
*F16L 3/22* (2006.01)
*F16L 3/10* (2006.01)
(52) U.S. Cl.
CPC .............. *F16L 3/222* (2013.01); *F16L 3/1075* (2013.01)
(58) Field of Classification Search
CPC ................ F16L 3/13; F16L 3/12; F16L 3/08; F16L 3/1075; Y10T 24/1453; Y10T 24/1471
USPC .............. 248/58, 62, 63, 65, 74.1, 74.2, 74.4, 248/316.1, 316.5, 316.6; 174/72 C, 76, 77 R, 174/78, 88 R, 545, 19, 21 R, 24, 68.1; 138/106
See application file for complete search history.

(56) References Cited

U.S. PATENT DOCUMENTS

| | | | | |
|---|---|---|---|---|
| 4,669,156 A * | 6/1987 | Guido | .................... | F16L 3/2235 24/297 |
| 5,033,701 A * | 7/1991 | Kraus | .................. | B60R 16/0215 248/68.1 |
| 5,367,750 A * | 11/1994 | Ward | ........................ | F16L 3/12 24/16 PB |
| 5,535,969 A * | 7/1996 | Duffy, Jr. | ................. | F16L 3/227 24/487 |
| 5,568,906 A * | 10/1996 | Hahn | ........................ | F16L 3/13 248/229.13 |
| 5,613,655 A * | 3/1997 | Marion | .................. | F16L 3/2235 24/339 |
| 5,653,411 A * | 8/1997 | Picco | ..................... | F16L 3/2235 24/339 |
| 6,053,458 A | 4/2000 | Meyer | | |
| 6,089,513 A * | 7/2000 | Cau | .......................... | B60K 15/01 248/68.1 |
| 6,565,049 B2 * | 5/2003 | Hahn | ................... | B60R 16/0215 248/68.1 |
| 7,172,162 B2 * | 2/2007 | Mizukoshi | ............ | F16L 3/2235 248/49 |
| 7,201,352 B2 * | 4/2007 | Kawai | .................... | F16L 3/1075 24/543 |
| 7,770,850 B2 * | 8/2010 | Allmann | ............... | F16L 3/2235 248/65 |
| 8,020,812 B2 * | 9/2011 | Matsuno | ............... | F16L 3/1075 24/336 |
| 8,066,250 B2 * | 11/2011 | Vukadin | ................ | F16B 21/088 248/562 |
| 8,157,223 B2 * | 4/2012 | Stau | ....................... | F16L 55/035 248/74.2 |
| 8,708,289 B2 * | 4/2014 | Allenbach | ............. | F16L 3/2235 248/68.1 |
| 8,967,556 B2 * | 3/2015 | Meyers | .................. | F16L 3/2235 248/60 |
| 9,297,479 B2 * | 3/2016 | Kato | ...................... | F16L 3/2235 |
| 2012/0153095 A1 * | 6/2012 | Child | .................... | F16L 3/2235 248/68.1 |

* cited by examiner

*Primary Examiner* — Terrell McKinnon
*Assistant Examiner* — Michael McDuffie

(57) ABSTRACT

A tube clip assembly incorporating a base having at least one tube support cradle and a displaceable lid adapted to be secured in overlying relation to the base to retain a tube in substantially stationary relation within the tube support cradle. Flexible arms are disposed on either side of the tube support cradle. The flexible arms are adapted to compressively engage the tube when the lid is closed such that a portion of the arms may bite into the tube thereby resisting both axial and rotational movement of the tube.

20 Claims, 7 Drawing Sheets

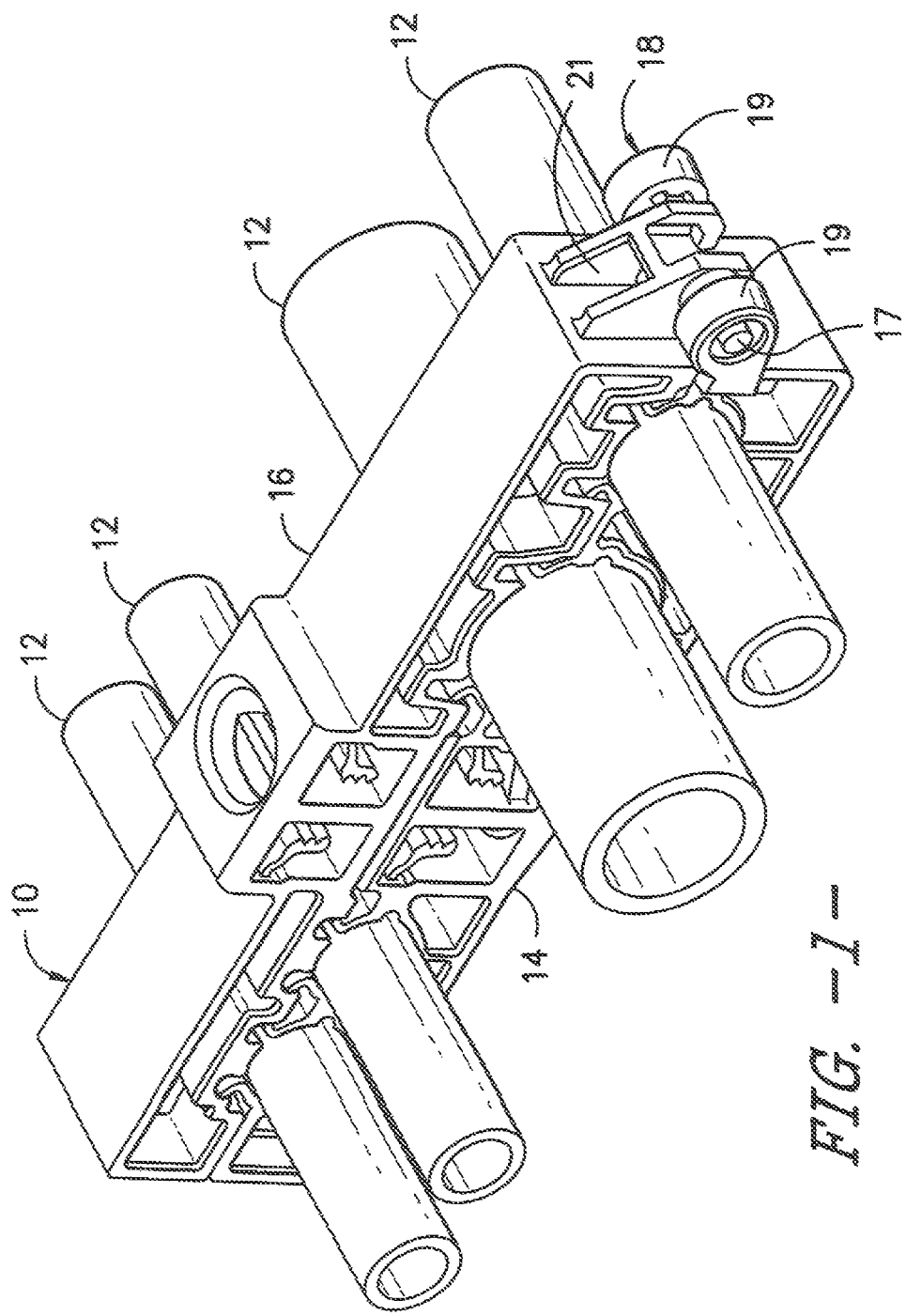
FIG. -1-

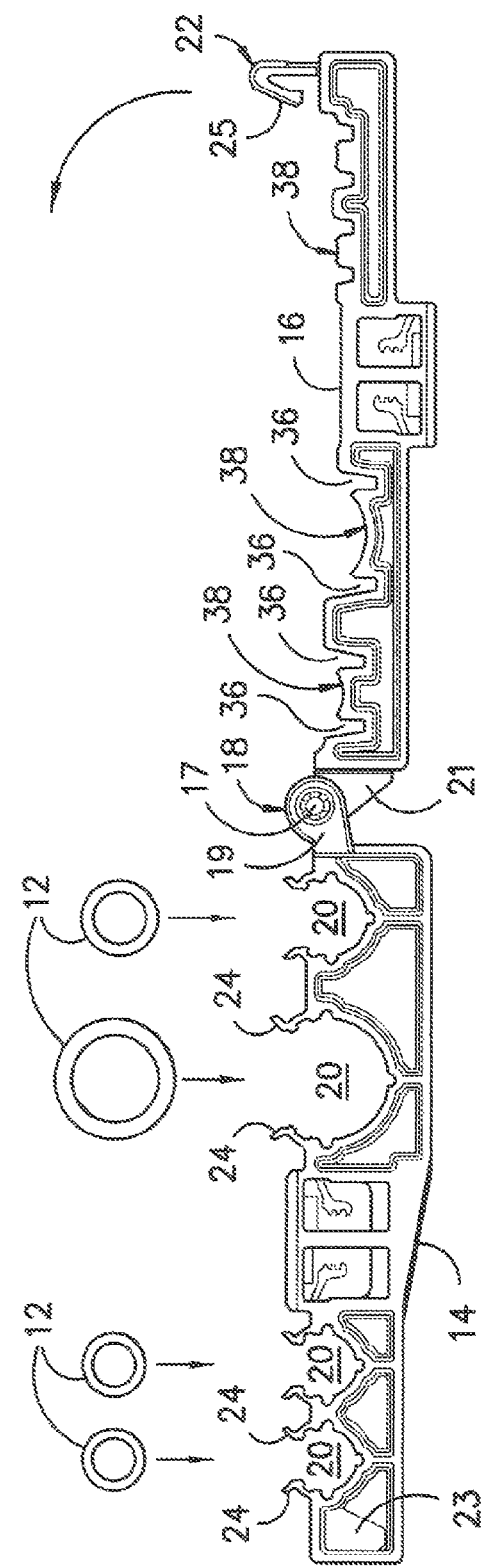
FIG. -2-

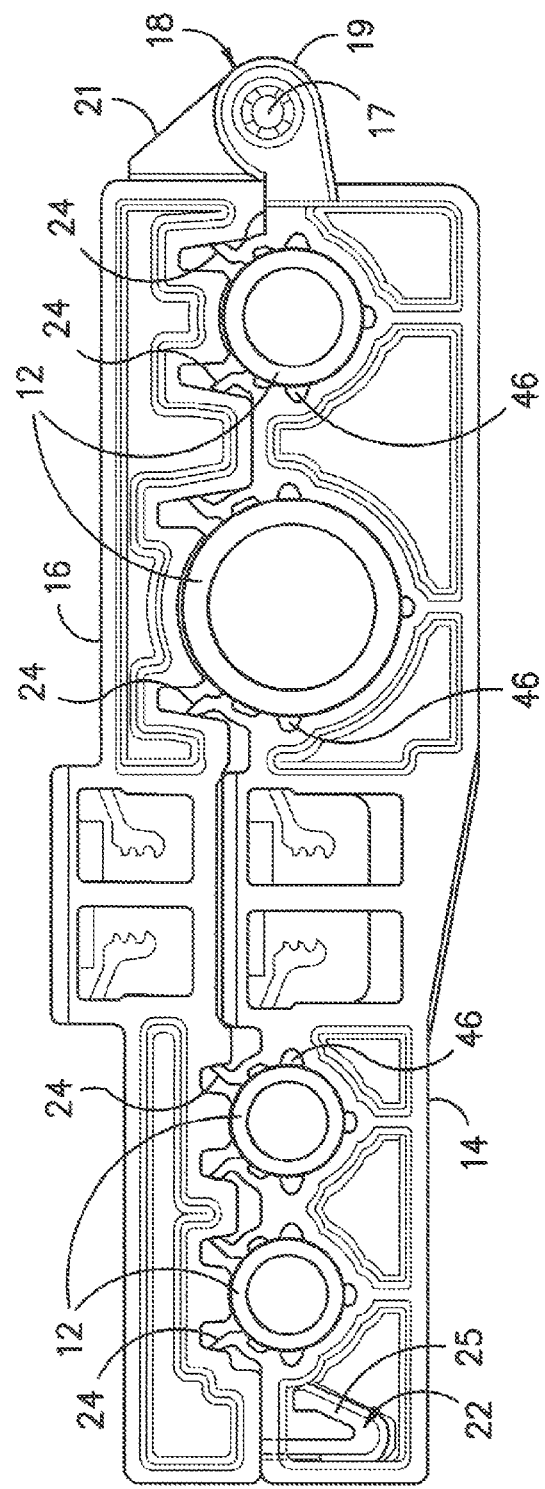
FIG. -3-

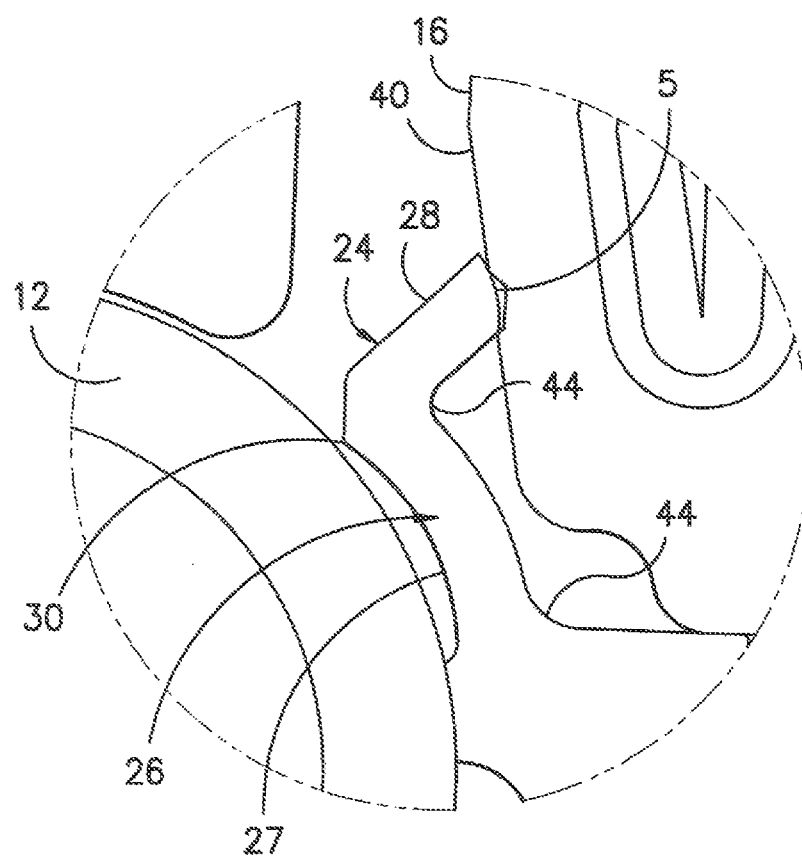
FIG. -4-

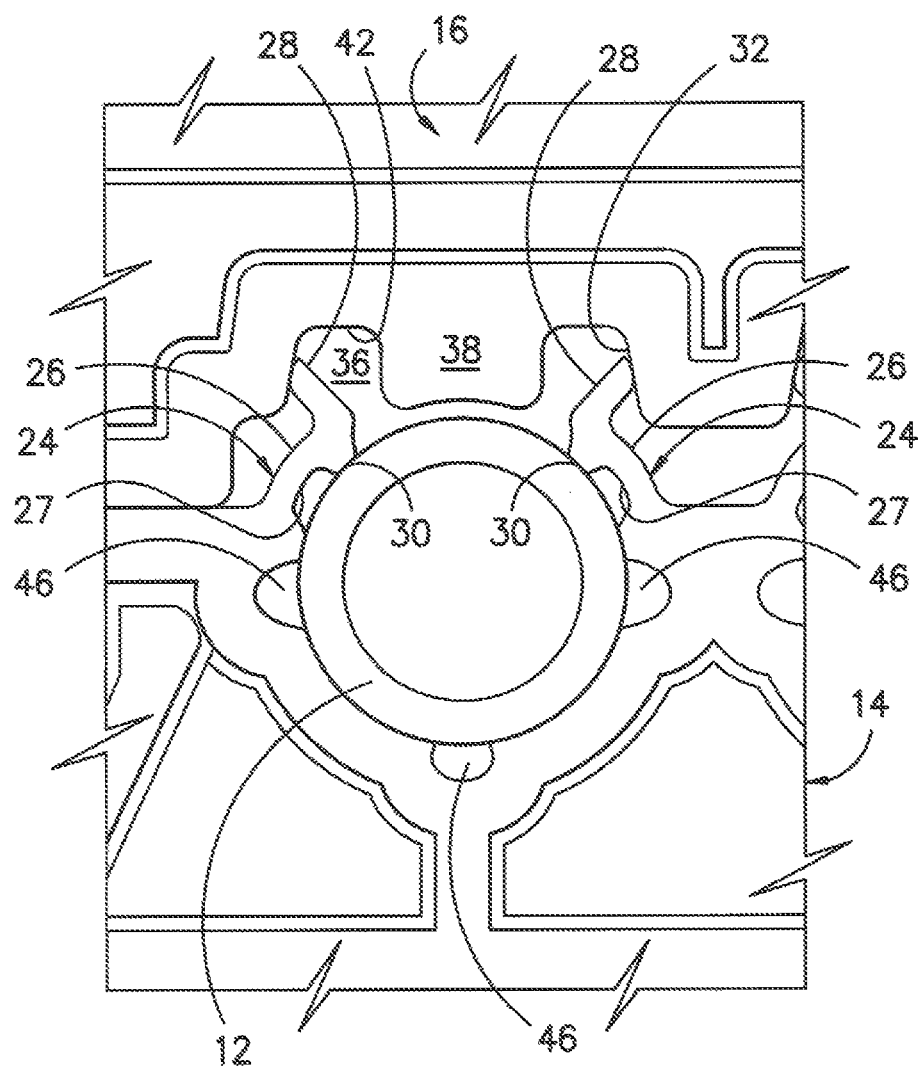
FIG. -5-

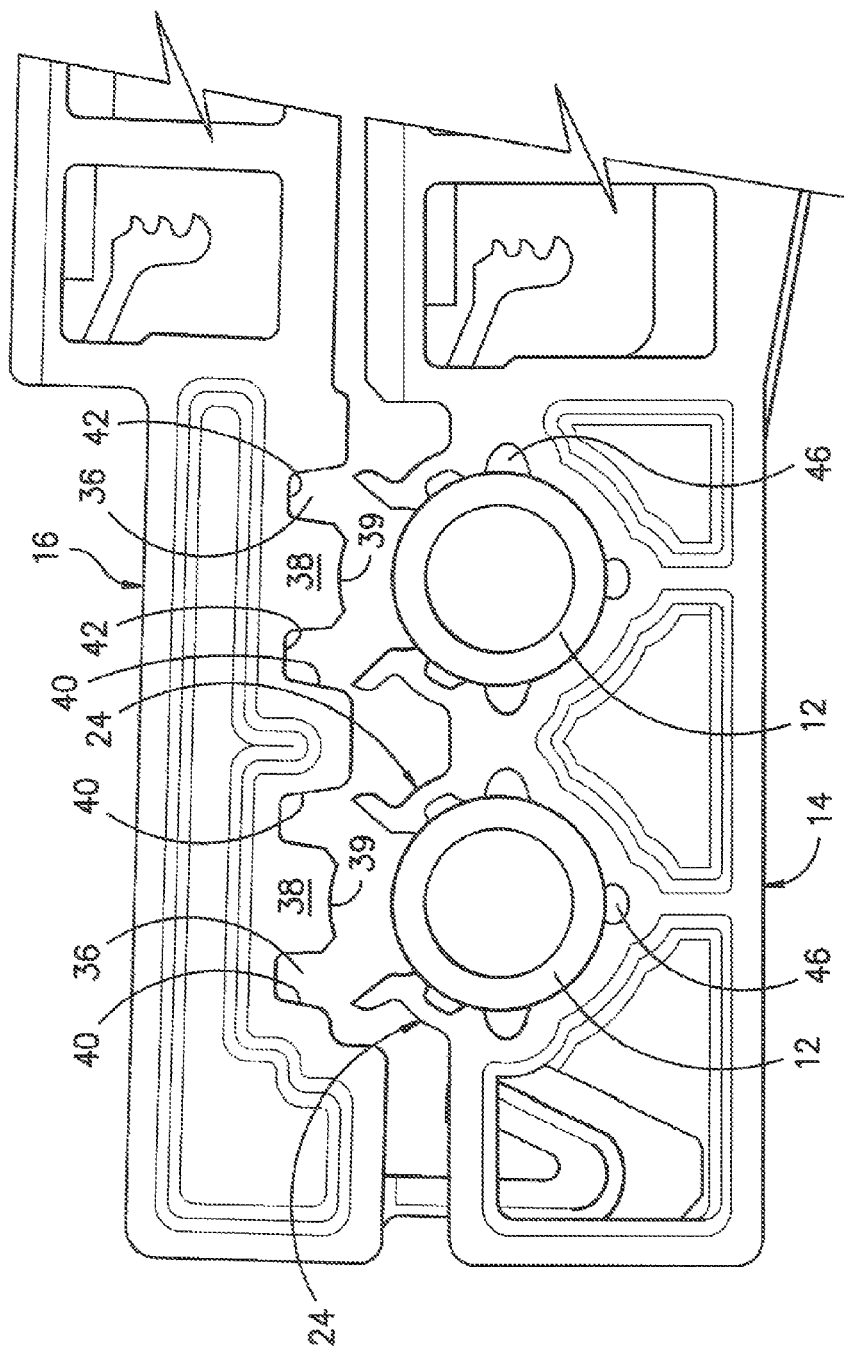

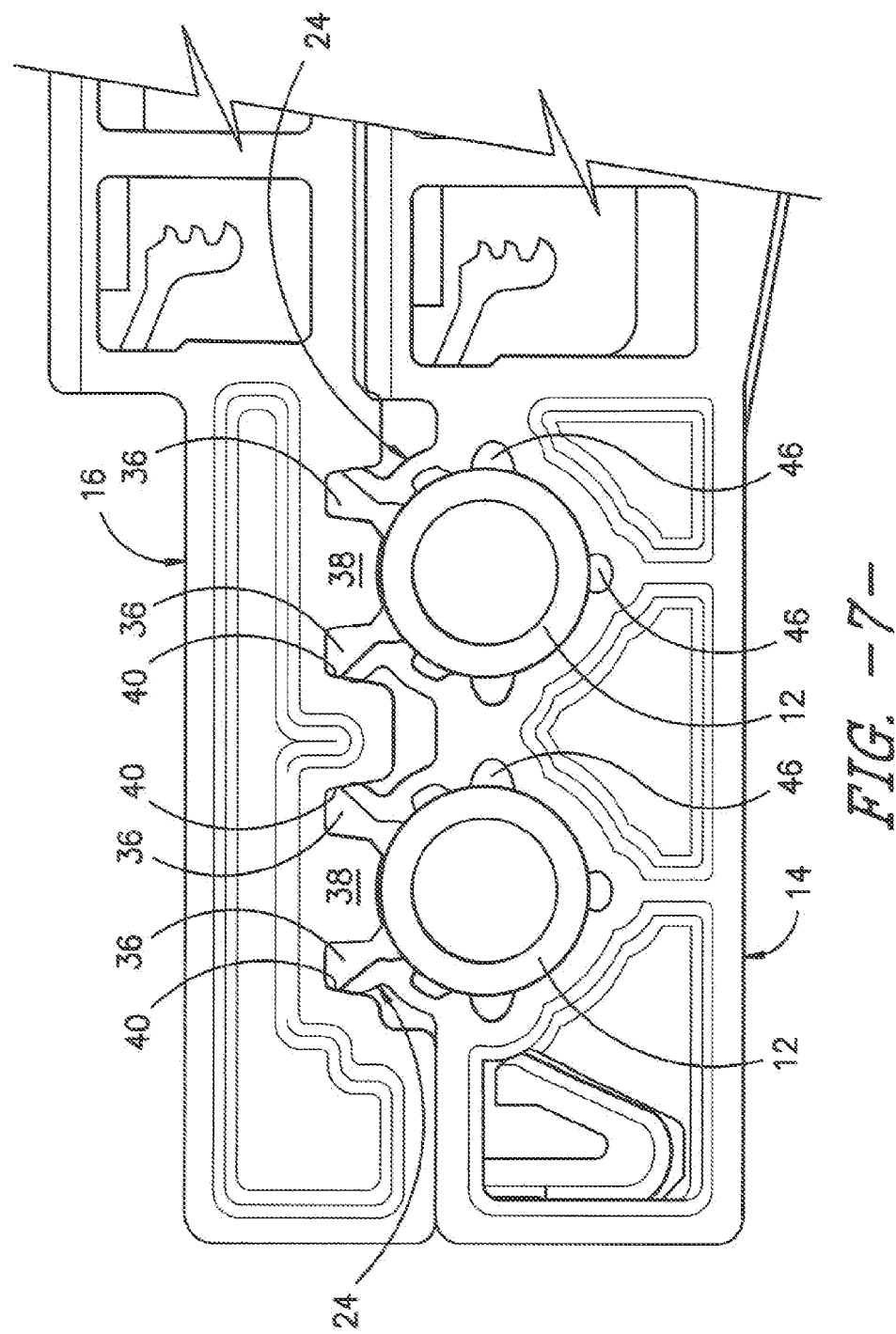
FIG. -7-

TUBE CLIP ASSEMBLY

CROSS-REFERENCE TO RELATED APPLICATIONS

This non-provisional application claims the benefit of, and priority from, U.S. Provisional Application 62/065,862 having a filing date of Oct. 20, 2014. The contents of such earlier application and all other documents referenced herein are hereby incorporated by reference as if set forth in their entirety

TECHNICAL FIELD

The present disclosure relates generally to clips adapted to support tubes such as lines carrying gases or liquids. By way of example only, and not limitation, such clips may find application in environments of use such as transportation vehicles including automobiles, aircraft and the like. One exemplary environment of use may be to support fluid lines for brake and fuel systems and the like which are often coated for protection during use. However, the features of the present disclosure may likewise find application in other environments as well.

BACKGROUND

In various environments of use, tubes carrying gaseous or liquid fluid media are routed along a desired path between components. According to prior known practices, these lines typically have been supported by holding blocks. Some prior holding blocks have been in the form of metal blocks having holes to accommodate tubes passing therethrough. While the practice of using a metal support block may provide a secure support structure, the use of metal holding blocks may give rise to certain deficiencies. In particular, such metal holding blocks may be relatively expensive to produce and have relatively high weight. Accordingly, an improved holding assembly which reduces weight while providing a secure support structure would be desirable.

SUMMARY OF THE DISCLOSURE

The present disclosure provides advantages and alternatives over the prior art by providing a tube clip assembly incorporating a base having at least one tube support cradle and a displaceable lid adapted to be secured in overlying relation to the base to retain a tube in substantially stationary relation within the tube support cradle. Flexible arms are disposed on either side of the tube support cradle. The flexible arms are adapted to compressively engage the tube when the lid is closed such that a portion of the arms may bite into the tube thereby resisting both axial and rotational movement of the tube.

In accordance with one exemplary aspect, the present disclosure provides a tube clip assembly adapted to support a plurality of fluid transport tubes. The tube clip assembly includes a contoured base having an upper surface comprising at least one arcuate support cradle. The arcuate support cradle is adapted to support a supported fluid transport tube. The arcuate support cradle includes a pair of flexible arms of dogleg construction disposed on opposing sides of the arcuate support cradle. The flexible arms each include a proximal leg segment and a distal leg segment intersecting at an elbow defining a thrust bump projecting towards the supported fluid transport tube. The proximal leg segment projects radially inwardly relative to the arcuate support cradle and the distal leg segment projects radially outwardly relative to the arcuate support cradle. A displaceable lid is operatively connected to the contoured base and is adapted to close in latched relation over the contoured base. The displaceable lid has a lower surface comprising at least one saddle structure oriented for disposition in opposing relation to the arcuate support cradle and between the pair of flexible arms when the displaceable lid is closed over the contoured base lid. The displaceable lid further includes a pair of depressions disposed on either side of the saddle structure. Each of the depressions includes a wedge surface adapted to engage the distal leg segment of one of the pair of flexible arms and to urge the thrust bump into contacting engagement with the supported fluid transport tube as the displaceable lid is closed in covering relation over the contoured base, such that the supported fluid transport tube is restricted against both axial and rotational movement.

Other features and advantages of the disclosure will become apparent to those of skill in the art upon review of the following detailed description, claims and drawings.

BRIEF DESCRIPTION OF THE DRAWINGS

FIG. 1 is a schematic perspective view illustrating an exemplary embodiment of a tube clip assembly consistent with the present disclosure supporting a plurality of tubes;

FIG. 2 is a schematic exploded side view of the exemplary tube clip assembly of FIG. 1 with the lid in the open position;

FIG. 3 is a schematic side view of the exemplary tube clip assembly of FIG. 1 with the lid in the closed position;

FIG. 4 is an enhanced schematic view of the identified portion of FIG. 3, illustrating the compressive engagement between a flexible arm and a retained tube when the lid is in the closed position;

FIG. 5 is a schematic view illustrating a tube retained within a clip assembly consistent with the present disclosure wherein the tube held between a pair of flexible arms when the lid is in the closed position;

FIG. 6 is a schematic view illustrating a clip assembly consistent with the present disclosure with the lid spaced slightly away from the base prior to complete closing; and FIG. 7 is a view similar to FIG. 6, but with the lid fully closed.

Before the exemplary embodiments of the invention are explained in detail, it is to be understood that the invention is in no way limited in its application or construction to the details and the arrangements of the components set forth in the following description or illustrated in the drawings. Rather, the invention is capable of other embodiments and of being practiced or being carried out in various ways. Also, it is to be understood that the phraseology and terminology used herein are for purposes of description only and should not be regarded as limiting. The use herein of terms such as "including" and "comprising" and variations thereof is meant to encompass the items listed thereafter and equivalents thereof as well as additional items and equivalents thereof.

DETAILED DESCRIPTION OF PREFERRED EMBODIMENTS

Reference will now be made to the drawings, wherein to the extent possible, like elements are designated by like reference numerals in the various views. Referring now jointly to FIGS. 1 and 2, an exemplary embodiment of a tube clip assembly 10 consistent with the present disclosure is shown. The tube clip assembly may be formed from any suitable material, although relatively high density polymers may be preferred. By way of example only, and not limitation, suitable polymers may include acetal resin, polyester and Nylon although other suitable materials may be used if desired. As will be appreciated, such polymeric materials may be molded by techniques such as injection molding and the like to produce complex geometries.

As illustrated, in the exemplary tube clip assembly 10 shown in FIGS. 1 and 2, tubes 12 of generally hollow construction along their length are secured in clamped relation between a contoured base 14 and a complementary displaceable lid 16. By way of example only, the tubes 12 may be fluid tubes operatively connected to an automotive fuel or brake system. However, other types of tubes and environments of use may likewise be accommodated.

In the illustrated exemplary construction, the lid 16 may be rotated about a swivel hinge 18 located at one end of the tube clip assembly 10. As will be appreciated, in this construction, the lid 16 may be moved into and away from covering relation relative to the base 14 by rotation at the swivel hinge 18. According to one exemplary practice, the entire clip assembly 10 may be formed by molding as a unitary structure wherein the swivel hinge 18 has a construction consistent with the description in U.S. Pat. No. 6,053,458 which is incorporated herein by reference. In this regard, the swivel hinge 18 may include a pair of opposing swivel bore supports 19 (only one shown) containing an integrally formed swivel shaft 17 defining the axis of rotation by the lid 16. As best seen in FIG. 2, in the illustrated exemplary construction, a bridge element 21 operatively connects the swivel hinge 18 to the body of lid 16 to permit rotation of the lid. Of course, other techniques for displacement of the lid 16 may likewise be used if desired.

Referring now to FIGS. 2-5, it may be seen that the tubes 12 may be set into support cradles 20 in the base 14. While the illustrated exemplary construction incorporates four support cradles 20, it is to be appreciated that a greater or lesser number of cradles 20 may be utilized as desired. Accordingly, a clip assembly 10 consistent with the present disclosure may incorporate a single cradle 20 if desired. Moreover, the size of the individual cradles may be varied to accommodate tubes 12 of different diameters as may be desired.

As best seen in FIG. 3, the lid 16 may be closed over the tubes 12 and latched into place by use of an integral press-in hooking latch member 22 or the like. As best seen through joint reference to FIGS. 2 and 3, the latch member 22 may be formed integrally with lid 16. Upon closure of the lid 16, the latch member 22 may be press-fit into an opening (not shown) in the base 14 for snap-fit capture within a retaining well 23 (FIG. 2) in the base. The lid 16 is thereby reversibly locked in place relative to the base 14. That is, the resilient hooking arm 25 of the latch member 22 may be flexed inwardly during insertion into the retaining well 23 and then snap behind an overlying portion of the base 14 as insertion is completed. This locking relation may thereafter be reversed if desired by use of a manipulating tool to flex the hooking arm 25 of the latch member 22 as the lid 16 is raised away from the base 14.

As best seen in FIGS. 2, 4 and 5, in the exemplary construction, flexible arms 24 are of substantially dogleg construction and may be positioned on either side of each support cradle 20. The flexible arms 24 preferably extend away from the opposing upper edges of each support cradle 20. As illustrated in FIGS. 4 and 5, in the exemplary embodiment the flexible arms 24 may each include a proximal leg segment 26 which is angled generally radially inwardly relative to the interior of the cradle 20. As shown, the proximal leg segment 26 may be curved so as to define a concave interior surface 27 for disposition in opposing relation to an outer convex surface of a tube 12. The flexible arms 24 may each further include a distal leg segment 28 angled generally radially outwardly relative to the interior of the cradle 20. As best seen in FIG. 5, substantially at the intersection of the proximal segment 26 and the distal segment 28, an inwardly projecting thrust bump 30 extends towards the tube 12.

As best seen in FIGS. 4-7, the interior surface of the lid 16 may include a pattern of depressions 36 disposed on either side of saddle structures 38. Each of the saddle structures 38 may include a slightly concave distal surface 39 oriented for disposition in overlying relation to complementary support cradles 20 when the lid 16 is in the closed position (FIG. 5). Thus, when the lid is closed, the concave distal surface 39 may contact the tube 12 disposed within the complementary support cradle 20.

As shown, the depressions 36 positioned on either side of each saddle structure 38 include may include outboard wedge surfaces 40 which contact the tips of the distal leg segments 28 on the flexible arms 24. In the illustrated construction, the outboard wedge surfaces 40 of the depressions 36 form an angle of greater than 90 degrees with the base 42 of those depressions. Thus, as the lid 16 is closed, the outboard wedge surfaces will progressively urge the flexible arms 24 inwardly towards the tubes 12 carried within the support cradles 20. Thus, once a side wall defining a wedge surface 40 contacts a flexible arm 24, further downward movement of the lid 16 will urge the flexible arm 24 radially inwardly towards the tube 12 within the cradle. Of course, if desired, a depression 36 with a sidewall defining a wedge surface 40 may be provided for each flexible arm 24 as shown.

In operation, the tubes 12 may be set into the support cradles 20 and the lid 16 is then closed. As the lid 16 closes, the wedge surfaces 40 on the lid 16 engage the tips of flexible arms 24. As the lid 16 moves downwardly, the flexible arms 24 are progressively urged radially inwardly and are caused to bend at flex points 44 (FIG. 4) thereby pressing the thrust bumps 30 into the surface of the tubes 12. Each of the tubes 12 may thereby be seated securely within its respective support cradle 20. As the thrust bumps 30 are pressed into contact with the tubes 12, the thrust bumps 30 will bite into the tube coatings. This biting engagement acts to restrict both axial and rotational movement of the tubes 12.

As shown, radial cutouts 46 may be disposed at positions around the support cradles 20 to help facilitate accommodation of a variety of tube diameters. In this regard, it will be understood that the polymer or other material forming the base 14 may have some degree of flexibility. While an arrangement of three semi-circular cutouts 46 is illustrated, it is likewise contemplated that a different number and/or shape of cut-outs may be used. Moreover, the use of such cut-outs may be eliminated if desired.

As will be appreciated, a tube clip assembly 10 consistent with the present disclosure provides a number of benefits. By way of example only, one benefit may be a large tolerance for different tube diameters. As illustrated in the exemplary embodiments, a tube clip assembly 10 consistent with the principles of the present disclosure may be designed to simultaneously accommodate multiple tubes of different sizes. Of course, such a tube clip assembly 10 may likewise be constructed to accommodate tubes of uniform size if desired.

Another benefit of a tube clip assembly 10 consistent with the present disclosure is the establishment of substantial resistance to axial movement by the tubes 12 hereby satisfying high thrust force requirements for many environments of use. In this regard, the biting action of the thrust bumps 30 provides very high friction resistance thereby preventing any undesired axial sliding of the tubes 12.

Yet another benefit of a tube clip assembly 10 consistent with the present disclosure is the establishment of substantial resistance to rotational movement by the tubes 12 hereby satisfying high torque requirements for many environments of use. In this regard, the biting action of the thrust bumps 30 provides very high friction resistance thereby preventing any undesired rotation of the tubes 12.

Despite the substantial stability provided by a tube clip assembly 10 consistent with the present disclosure, such a construction nonetheless provides substantial ease of use. One or more tubes 12 may be easily inserted into the support cradles 20 and then locked into place by simply closing the lid 16. The tubes may also be subsequently removed for repair or replacement if desired by reversing the latching structure and opening the lid.

Of course, variations and modifications of the foregoing are within the scope of the present disclosure. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A tube clip assembly adapted to support a plurality of fluid transport tubes, the tube clip assembly comprising:
    a contoured base having an upper surface comprising at least one arcuate support cradle, wherein said arcuate support cradle is adapted to support a supported fluid transport tube, wherein the at least one arcuate support cradle includes a pair of flexible arms of dogleg construction disposed on opposing sides of said at least one arcuate support cradle, the flexible arms each including a proximal leg segment and a distal leg segment intersecting at an elbow defining a thrust bump projecting towards the supported fluid transport tube, the proximal leg segment projecting radially inwardly relative to said at least one arcuate support cradle, the distal leg segment projecting radially outwardly relative to said at least one arcuate support cradles; and
    a displaceable lid operatively connected to the contoured base, the displaceable lid being adapted to close in latched relation over the contoured base, the displaceable lid having a lower surface comprising at least one saddle structure oriented for disposition in opposing relation to said at least one arcuate support cradle and between the pair of flexible arms when the displaceable lid is closed over the contoured base lid, wherein the displaceable lid includes a pair of depressions disposed on either side of said at least one saddle structure, each of said depressions including a wedge surface adapted to engage the distal leg segment of one of the pair of flexible arms and to urge the thrust bump of said one of the pair of flexible arms into contacting engagement with the supported fluid transport tube as the displaceable lid is closed in covering relation over the contoured base, such that the supported fluid transport tube is restricted against both axial and rotational movement.

2. The tube clip assembly as recited in claim 1, wherein the contoured base comprises a plurality of arcuate support cradles adapted to support fluid transport tubes.

3. The tube clip assembly as recited in claim 2, wherein the plurality of arcuate support cradles includes cradles of at least two different diameters.

4. The tube clip assembly as recited in claim 1, wherein the contoured base is a one-piece structure formed from molded polymer.

5. The tube clip assembly as recited in claim 4, wherein the proximal leg segment of has a concave interior surface adapted for disposition in opposing relation to an outer surface of the supported fluid transport tube.

6. The tube clip assembly as recited in claim 1, wherein the displaceable lid is a one-piece structure formed from molded polymer.

7. The tube clip assembly as recited in claim 6, wherein said at least one saddle structure comprises a concave distal surface adapted for disposition in opposing relation to an outer surface of the supported fluid transport tube when the displaceable lid is in closed and latched relation over the contoured base.

8. The tube clip assembly as recited in claim 7, wherein the contoured base comprises a plurality of arcuate support cradles and wherein the displaceable lid comprises a plurality of saddle structures, wherein each of said plurality of saddle structures comprises a concave distal surface adapted for disposition in opposing relation to an outer surface of a supported fluid transport tube when the displaceable lid is in closed and latched relation over the contoured base.

9. The tube clip assembly as recited in claim 8, wherein the plurality of arcuate support cradles comprises support cradles of at least two different diameters and wherein the displaceable lid comprises a plurality of saddle structures of at least two different widths.

10. The tube clip assembly as recited in claim 1, wherein the displaceable lid is disposed in hinging relation to the contoured base.

11. The tube clip assembly as recited in claim 10, further comprising a press-in latch member adapted to operatively hold the displaceable lid in covering relation to the contoured base.

12. The tube clip assembly as recited in claim 11, wherein the press-in latch member is substantially hook shaped, including a resilient hooking arm.

13. The tube clip assembly as recited in claim 12, wherein the press-in latch member is integral with the displaceable lid and is adapted for snap-fit capture within a retaining well in the contoured base when the displaceable lid is in closed and latched relation over the contoured base.

14. A tube clip assembly adapted to support a plurality of fluid transport tubes, the tube clip assembly comprising:
a contoured base of molded polymeric material having an upper surface comprising a plurality of arcuate support cradles, wherein said arcuate support cradles are each adapted to support a supported fluid transport tube, wherein at least one of the arcuate support cradles includes a pair of flexible arms of dogleg construction disposed on opposing sides of said at least one of the arcuate support cradles, the flexible arms each including a proximal leg segment and a distal leg segment intersecting at an elbow defining a thrust bump projecting towards the supported fluid transport tube, the proximal leg segment having a concave interior surface and projecting radially inwardly relative to said at least one of the arcuate support cradles, the distal leg segment projecting radially outwardly inwardly relative to said at least one of the arcuate support cradles; and
a displaceable lid of molded polymeric material connected in hinging relation to the contoured base, the displaceable lid including a latch and being adapted to close in covering relation over the contoured base, the displaceable lid having a lower surface comprising at least one saddle structure oriented for disposition in opposing relation to said at least one of the arcuate support cradles and between the pair of flexible arms when the displaceable lid is closed over the contoured base lid, wherein said at least one saddle structure comprises a concave distal surface and wherein the displaceable lid includes a pair of depressions disposed on either side of said at least one saddle structure, each of said depressions including a wedge surface adapted to engage the distal leg segment of one of the pair of flexible arms and to urge the thrust bump of said one of the pair of flexible arms into contacting engagement with the supported fluid transport tube as the displaceable lid is closed in covering relation over the contoured base, such that the supported fluid transport tube is restricted against both axial and rotational movement.

15. The tube clip assembly as recited in claim 14, wherein the contoured base is a one-piece structure formed from molded polymer.

16. The tube clip assembly as recited in claim 14, wherein the displaceable lid is a one-piece structure formed from molded polymer.

17. The tube clip assembly as recited in claim 14, wherein the plurality of arcuate support cradles comprises support cradles of at least two different diameters and wherein the displaceable lid comprises a plurality of saddle structures of at least two different widths.

18. The tube clip assembly as recited in claim 14, further comprising a press-in latch member adapted to operatively hold the displaceable lid in covering relation to the contoured base, wherein the press-in latch member is substantially hook shaped, including a resilient hooking arm.

19. The tube clip assembly as recited in claim 18, wherein the press-in latch member is integral with the displaceable lid and is adapted for snap-fit capture within a retaining well in the contoured base when the displaceable lid is in closed and latched relation over the contoured base.

20. A tube clip assembly adapted to support a plurality of fluid transport tubes, the tube clip assembly comprising:
a contoured base of one-piece molded construction material having an upper surface comprising a plurality of arcuate support cradles, wherein said arcuate support cradles are each adapted to support a supported fluid transport tube, wherein at least one of the arcuate support cradles includes a pair of flexible arms of dogleg construction disposed on opposing sides of said at least one of the arcuate support cradles, the flexible arms each including a proximal leg segment and a distal leg segment intersecting at an elbow defining a thrust bump projecting towards the supported fluid transport tube, the proximal leg segment having a concave interior surface and projecting radially inwardly relative to said at least one of the arcuate support cradles, the distal leg segment projecting radially outwardly inwardly relative to said at least one of the arcuate support cradles;
a displaceable lid of one-piece molded construction connected in hinging relation to the contoured base, the displaceable lid including a latch and being adapted to close in covering relation over the contoured base, the displaceable lid having a lower surface comprising at least one saddle structure oriented for disposition in opposing relation to said at least one of the arcuate support cradles and between the pair of flexible arms when the displaceable lid is closed over the contoured base lid, wherein said at least one saddle structure comprises a concave distal surface and wherein the displaceable lid includes a pair of depressions disposed on either side of said at least one saddle structure, each of said depressions including a wedge surface adapted to engage the distal leg segment of one of the pair of flexible arms and to urge the thrust bump of said one of the pair of flexible arms into contacting engagement with the supported fluid transport tube as the displaceable lid is closed in covering relation over the contoured base, such that the supported fluid transport tube is restricted against both axial and rotational movement; and
a press-in latch member adapted to operatively hold the displaceable lid in covering relation to the contoured base, wherein the press-in latch member is substantially hook shaped, including a resilient hooking arm adapted for snap-fit capture within a retaining well in the contoured base when the displaceable lid is in closed and latched relation over the contoured base.

* * * * *